United States Patent [19]
Zito

[11] Patent Number: 5,496,659
[45] Date of Patent: Mar. 5, 1996

[54] ELECTROCHEMICAL APPARATUS FOR ENERGY STORAGE AND/OR POWER DELIVERY COMPRISING MULTI-COMPARTMENT CELLS

[75] Inventor: Ralph Zito, Chapel Hill, N.C.

[73] Assignee: National Power PLC, Wiltshire, United Kingdom

[21] Appl. No.: 128,117

[22] Filed: Sep. 29, 1993

Related U.S. Application Data

[63] Continuation-in-part of Ser. No. 961,112, Oct. 14, 1992, abandoned.

[51] Int. Cl.$^6$ .............................. H01M 4/36; H01M 10/36
[52] U.S. Cl. ..................... 429/105; 429/107; 429/199; 429/247
[58] Field of Search .................... 429/105, 107, 429/199, 247

[56] References Cited

U.S. PATENT DOCUMENTS

| | | | |
|---|---|---|---|
| 2,615,932 | 10/1952 | Marko | 136/122 |
| 2,669,598 | 2/1954 | Marko | 136/122 |
| 3,077,507 | 2/1963 | Kordesch | 136/86 |
| 3,121,028 | 2/1964 | Story | 136/6 |
| 3,227,585 | 1/1966 | Langford | 136/86 |
| 3,355,328 | 11/1967 | Meyers | 136/93 |
| 3,540,934 | 11/1970 | Boeke | 136/86 |
| 3,663,300 | 5/1972 | Nanis et al. | 136/86 |

(List continued on next page.)

FOREIGN PATENT DOCUMENTS

| | | |
|---|---|---|
| 0039222 | 11/1981 | European Pat. Off. . |
| 165000 | 6/1985 | European Pat. Off. ........ H01M 10/42 |
| 383540 | 1/1908 | France . |
| 1291005 | 3/1962 | France . |
| 1938580 | 11/1970 | Germany . |
| 1571985 | 2/1971 | Germany . |
| 4129567 | 3/1993 | Germany . |
| 61-206180 | 9/1986 | Japan . |
| 63-221562 | 9/1988 | Japan . |
| 1183071 | 7/1989 | Japan . |
| 980596 | 6/1963 | United Kingdom . |
| 1212387 | 12/1964 | United Kingdom .......... H01M 27/30 |
| 1211593 | 11/1970 | United Kingdom .......... H01M 27/04 |
| 1237964 | 7/1971 | United Kingdom . |
| 1210693 | 10/1971 | United Kingdom .......... H01M 27/00 |
| 1364795 | 8/1974 | United Kingdom .......... H01M 27/00 |
| 2042250 | 2/1979 | United Kingdom . |
| 2010574 | 6/1979 | United Kingdom . |
| 1569399 | 6/1980 | United Kingdom .......... H01M 10/36 |
| WO89/05528 | 12/1988 | WIPO ........................ H01M 10/44 |
| WO90/03666 | 6/1989 | WIPO ............................ H01M 8/20 |

OTHER PUBLICATIONS

Chemical Abstracts, vol. 112, No. 14, 2nd Apr. 1990, Columbus Ohio, US; Abstract No. 119956n.

Journal of the Electrochemical Society, vol. 117, No. 12, Dec. 1970, Manchester, New Hampshire USA; pp. 1527–1529.

(Abstract continued on next page.)

*Primary Examiner*—David B. Springer
*Attorney, Agent, or Firm*—Antonelli, Terry, Stout & Kraus

[57] ABSTRACT

An electrochemical apparatus for energy storage and power generation comprises a single cell or an array of unit cells (10), each cell comprising a $+^{ve}$ electrode (12) and a $-^{ve}$ electrode (14) with a dual membrane in each cell dividing it into $+^{ve}$ chambers (22C and 24C) for posilyte and anolyte solutions (22, 24) which are recirculated through separate pumps (26, 28) and storage tanks (32, 34) and back to the chambers. The dual membranes in each cell provide a third chamber (23C) between the $+^{ve}$ chamber (22C) and the $-^{ve}$ chamber (24C), through which an idler electrolyte is circulated.

During the operation of the cell, any ionic species which cross the cation exchange membranes, which in an ideal system would remain in either the $+^{ve}$ chamber or the $-^{ve}$ chamber of the cell, will collect in the buffer chamber or chambers.

30 Claims, 9 Drawing Sheets

U.S. PATENT DOCUMENTS

| | | | |
|---|---|---|---|
| 3,920,474 | 11/1975 | Zito, Jr. et al. | 136/86 |
| 4,038,460 | 7/1977 | Walsh et al. | 429/15 |
| 4,053,684 | 10/1977 | Zito, Jr. et al. | 429/15 |
| 4,069,371 | 1/1978 | Zito | 429/21 |
| 4,117,204 | 9/1978 | Zito, Jr. | 429/19 |
| 4,215,182 | 7/1980 | Ang et al. | 429/15 |
| 4,218,519 | 8/1980 | Frank | 429/15 |
| 4,230,549 | 10/1980 | D'Agostino et al. | 259/8 |
| 4,328,287 | 5/1982 | Sammells et al. | 429/15 |
| 4,339,473 | 7/1982 | D'Agostino et al. | 427/44 |
| 4,390,602 | 6/1983 | Struthers | 429/26 |
| 4,407,902 | 10/1983 | Kummer | 429/15 |
| 4,414,090 | 11/1983 | D'Agostino et al. | 204/252 |
| 4,469,760 | 9/1984 | Giner et al. | 429/21 |
| 4,485,154 | 11/1984 | Remick et al. | 429/14 |
| 4,615,108 | 10/1986 | Tomazic | 29/623.2 |
| 4,786,567 | 11/1988 | Skyllas-Kazacos et al. | 429/19 |
| 4,828,942 | 5/1989 | Licht | 429/50 |
| 5,304,432 | 4/1994 | Townsend | 429/105 X |
| 5,436,087 | 7/1995 | Tomazic | 429/105 X |
| 5,445,905 | 8/1995 | Marsh et al. | 429/105 |

OTHER PUBLICATIONS

Kinetics of Polysulfide–thiosulfat disproportionation W. F. Giggenbach Inorg Chem 13 7 (1874) 1730–1733.

The blue solution of sulfur in water at elevated temperatures W. Giggenbach Inorg Chem 10 6 (1971) 1306–1308.

The blue solutions of sulfur in salt melts; W. Giggenbach Inorg Chem 10 6 (1971) 1308–1311.

Kinetics of aqueous polysulfide solutions I; P. Lessner J. Electrochem Soc 133 12 (1986) 2510–2516.

Kinetics of aqueous polysulfide solutions III; P. Lessner J. Electrochem Soc 133 12 (1986) 2517–2522.

Kinetics of aqueous polysulfide solutions; P. Lessner J. Electrochem Soc 135 1 (1988) 258–259.

Thermodynamics of aqueous sulfur species; R. C. Murray J. Electrochem Soc 130 4 (1983) 866–869.

Cation exchange selectivity of a perfluosulfonate polymer H. L. Yager ACS Symposium Series 180 (1982) 25–39.

Transport properties of perfluosulfonate polymer membranes; H. L. Yeager ACS Symposium Series 180 (1982) 41–63.

The cluster network model of ion clustering; T. D. Gierke ACS Symposium Series 180 (1982) 283–307.

Patent Abstracts of Japan, vol. 10, No. 61 (E–387) (2118) 11th Mar. 1986.

Chemical Abstracts, vol. 115, No. 2, 15th Jul. 1991, Columbus, Ohio, US; Abstracts No. 12352x.

Extended Abstracts, vol. 80, No. 2, 5th Oct. 1980, Princeton, New Jersey, USA pp. 413–414.

Chemical Abstracts, vol. 83, No. 12, 22nd Sep. 1975, Columbus, Ohio US; Abstract No. 100755g.

Proceedings of the 20th Intersociety Energy Conversion Engineering Conf. vol. 2, Aug. 1985, pp. 2.105–2.110.

Extended Abstracts, vol. 83, No. 2., 9th Oct. 1983, Princeton, New Jersey USA pp. 165–166.

Aqueous polysulphide flow–through electrodes P. M. Lessner J Appl. Electrochem 22 (1992) 927–934.

Electrolysis of sodium sulphide solutions W. R. Fetzer (1928) 1787–180 7.

Electrode photoelectrochemical storage cells; Bratin J. Electrochem Soc 129–11 (19820.

Bromine diffusion through Nafion perfluorinated ion exchange membranes F. G. Will; J. Electrochem Soc. 126 1 (1979) 36–41.

On the nature of blue solutions of sulfur W. Giggenbach J. Inorgs Nucl Chem 30 (1968) 3189–3201.

Equilibria involving polysulfide ions W. F. Giggenbach J. Inorg Chem 13 7 (1974) 1724–1730.

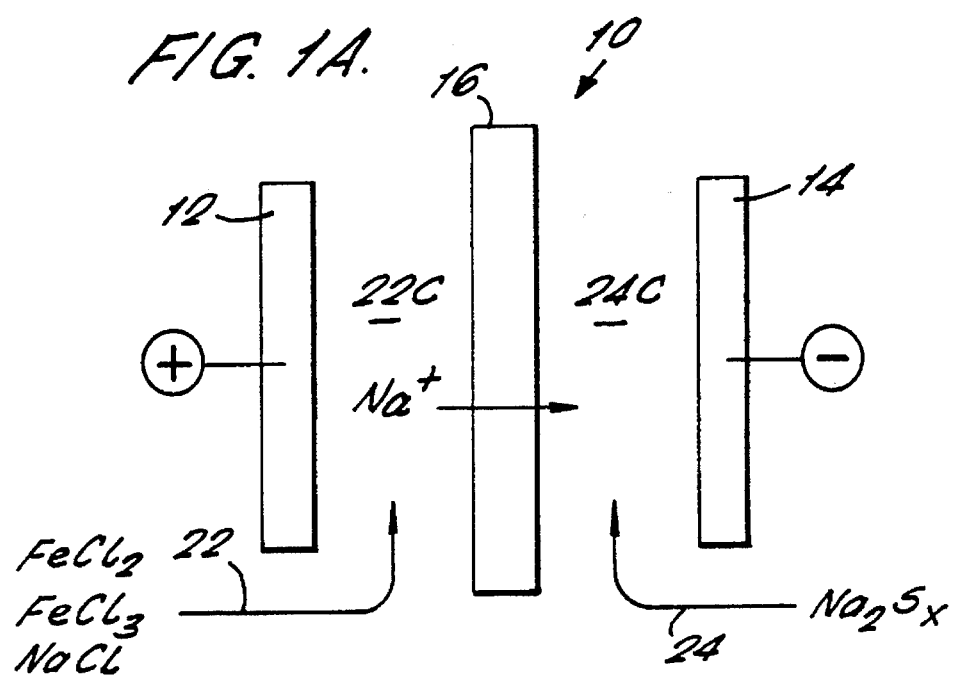
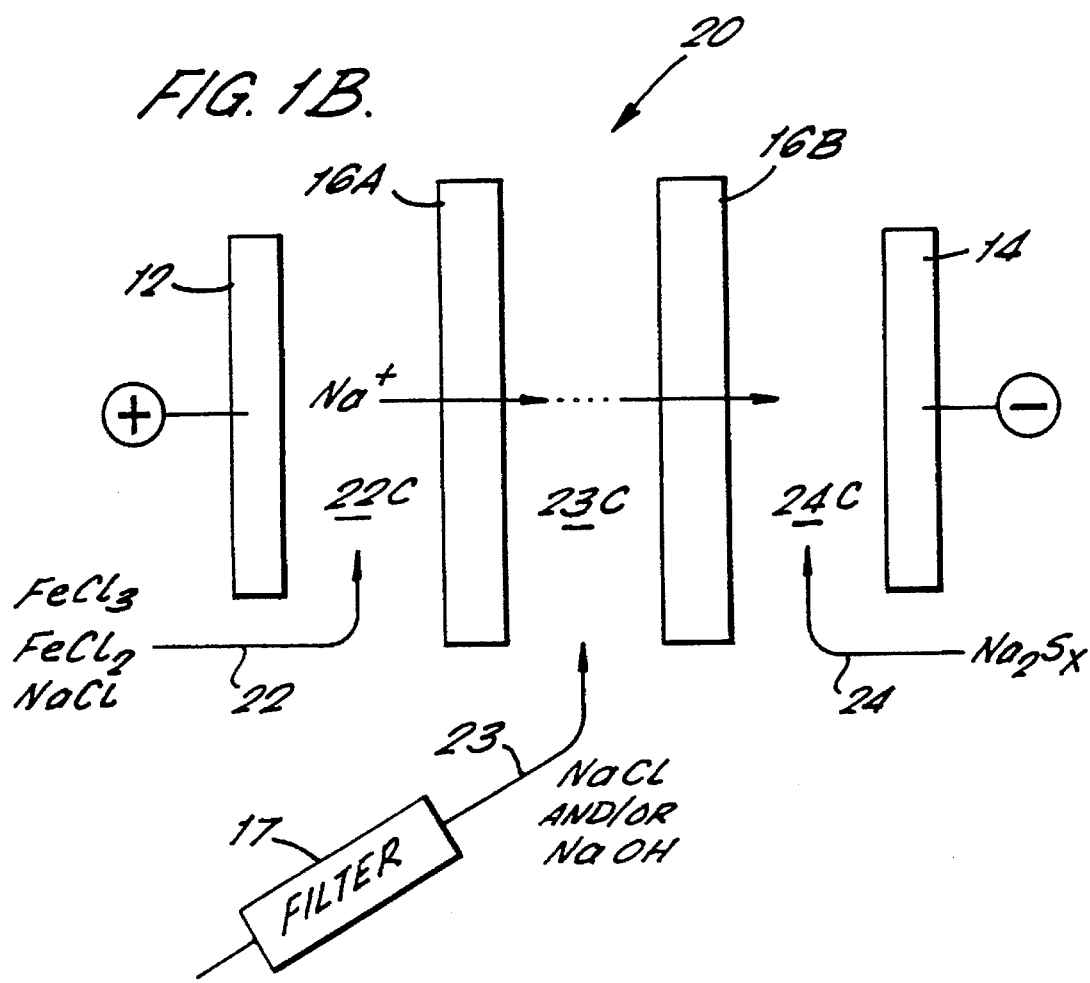

5,496,659

ELECTROCHEMICAL APPARATUS FOR ENERGY STORAGE AND/OR POWER DELIVERY COMPRISING MULTI-COMPARTMENT CELLS

CROSS REFERENCE TO RELATED APPLICATIONS

The present application is a Continuation-in-Part of my U.S. patent application Ser. No. 961,112 filed 14 Oct. 1992, now abandoned.

FIELD OF THE INVENTION

The present invention relates generally to energy storage and power generation systems wherein compensating electrochemical reactions occur at opposite positive (hereinafter $+^{ve}$) and negative (hereinafter $-^{ve}$) electrodes and energy is stored in, and drawn from, an electrolyte in charge and discharge cycles and, in particular, to electrochemical apparatus for energy storage and/or power delivery comprising multi-compartment cells. The reactions of interest for the purposes of this invention are substantially reversible such that driving current into such a system charges the system by storing energy in chemical reactants. Chemical reactions take place on either side of an ion transport system (such as a membrane) with selective charge carriers being transported through the membrane. During power generation these chemical reactions are reversed supplying current (power) to a load.

Some systems reconstitute or regenerate the reagents externally to restore the cell, as compared to driving current into the cell.

BACKGROUND OF THE INVENTION

Such energy storage and power generation systems have been known for many years. Major limitations of these systems have resulted from the practical application of what seems to be a simple direct chemical process. Hazardous materials, efficiencies, system size, plugging and clogging, gas formation, "plating out" or precipitation of the materials, membrane diffusion limitations, cost of materials and cost of operation highlight the practical problems. Another limitation of such systems is the loss of power output as the system discharges.

The fundamental chemical process in these systems is characterized by a chemical equation where the action proceeds in one direction in the charging of the system and in the opposite direction during the power generation by the system. An example of a redox system is given by the following chemical equation, the term "redox" defining reactions in which a reduction and a complementary oxidation occur together.

$$Cr^{2+}+Fe^{3+} \rightleftharpoons Cr^{3+}+Fe^{2+} \qquad \text{Eq. 1}$$

In this system, limitations exist since the chromium is expensive, and the chromium and iron, meant to be on either side of a membrane, cross over contaminating the other side. This necessitates frequent reprocessing of the electrolyte. Furthermore, noble metal catalysts are required to promote the reaction. Also, the system pH must be controlled to prevent gas formation.

U.S. Pat. No. 4,485,154 discloses an electrically chargeable anionically active reduction-oxidation system using a sulfide/polysulfide reaction in one half of the cell and an iodine/polyiodide, chlorine/chloride or bromine/bromide reaction in the other half of the cell.

The overall chemical reaction involved, for example for the bromine/sulfide system is $$Br_2+S^{2-} \rightleftharpoons 2Br^-+S \qquad \text{Eq. 2}$$

The electrochemical reaction takes place in separate but dependent bromine and sulfur reactions. The bromine reaction takes place on the $+^{ve}$ side of the membrane and the sulfur reaction on the $-^{ve}$ side of the membrane. When charging occurs the reaction goes from right to left and when discharging the reaction goes from left to right. During extended cycling of the cell ionic species diffuse through the membrane in an unwanted direction. Some sulfide diffuses into the $+^{ve}$ side of the cell and some of this sulfide is oxidised by the bromine in the $+^{ve}$ side to the sulfate $SO_4^{2-}$. Sulfates are not readily retrievable from the $+^{ve}$ electrolyte and thus represent a net loss of sulfur from the system.

Another reduction-oxidation system using a sulfide/polysulfide reaction in one half of the cell combines this reaction with an $Fe^{3+}/Fe^{2+}$ couple according to the following overall chemical equation:

$$2Fe^{3+}+S^{2-} \rightleftharpoons 2Fe^{2+}+S \qquad \text{Eq. 3}$$

The electrochemical reaction takes place in separate but dependent iron and sulfur reactions. The iron reaction takes place on the $+^{ve}$ side of the cell and the sulfide reaction on the $-^{ve}$ side of the cell. In this system, a cell containing only two compartments will not accept a charge if charge carrying ions are not present in the $+^{ve}$ chamber during charging of the cell. Attempting to charge such a cell results in an immediate high resistance and no current flows. This is because any iron ions travelling across the membrane react with the $S^{2-}$ ions to form an iron sulfide precipitate which clogs the pores of the membrane.

I have now developed an electrochemical apparatus for energy storage and/or power delivery which prevents or reduces the deposit of solids on the electrodes or the membranes, and which enables the electrolytes to be managed by reducing the formation of unwanted species or the formation of species which will interfere in the cell reaction.

SUMMARY OF THE INVENTION

Accordingly, the present invention provides an electrochemical apparatus for energy storage and/or power delivery comprising, in combination:

(a) means defining a single cell or an array of repeating cell structures, each cell with a chamber ($+^{ve}$ chamber) containing a $+^{ve}$ electrode and a chamber ($-^{ve}$ chamber) containing a $-^{ve}$ electrode, (b) means comprising a plurality of cation exchange membranes separating the $+^{ve}$ chamber and the $-^{ve}$ chamber of each cell by at least one buffer chamber, (c) means for circulating a $+^{ve}$ electrolyte through the $+^{ve}$ chamber (d) means for circulating a $-^{ve}$ electrolyte through the $-^{ve}$ chamber, (e) means for circulating an idler electrolyte through the said buffer chamber;

(f) means for connecting said $+^{ve}$ electrodes to energy source (charging) means and for delivery (discharge) load means, and (g) means for recharging the system by driving a DC current into the $+^{ve}$ electrode and out of the $-^{ve}$ electrode.

The apparatus of the present invention includes therein at least one buffer chamber separating the $+^{ve}$ chamber and the $-^{ve}$ chamber from one another by a plurality of cation exchange membranes. A plurality of buffer chambers may be used, if desired. During the operation of the cell, any ionic species which cross the cation exchange membranes, which in an ideal system would remain either in the $+^{ve}$ chamber or the $-^{ve}$ chamber of the cell, will collect in the buffer chamber or chambers. This chamber thus prevents the unwanted ionic species from forming unwanted precipitates or interfering in the cell operation.

The various compartments in the cell or cells are separated one from another by cation exchange membranes. Because of the incorporation of one or more buffer chambers into each cell, the constrictions on the choice of membrane are reduced because a single membrane does not have to try to satisfy both the requirements of the $+^{ve}$ electrolyte and the $-^{ve}$ electrolyte at the same time. Different membrane materials may be used to separate the $+^{ve}$ electrolyte from the buffer chamber and the $-^{ve}$ electrolyte from the buffer chamber.

The apparatus of the present invention may be used with the bromine/sulfide system described above and detailed in Eq. 2. The charge balance is provided by the transport of sodium, potassium, lithium or ammonium ions across the membranes in the cell. In carrying out this process, the idler electrolyte flowing through the buffer chamber will generally comprise a sulfide, for example, $Na_2S_x$, or a mixture of $Na_2S_x$ and NaBr.

During charging the charge balancing ions, for example $Na^+$ are transported across the membranes separating the $+^{ve}$ chamber from the $-^{ve}$ chamber to balance the charge and transform $Na_2S_x$ to $Na_2S$. The sulfur, which is present as a double charged polysulfide ion ($S^{2-}.S_y$, where $y$ may be as high as 4), is reduced initially to $S^{2-}.S_{y-1}$ and eventually to $S^{2-}$. Some of the sulfide, $S^{2-}$, ions migrate into the buffer chamber across the membrane separating the $-^{ve}$ chamber from the buffer chamber. $Br^-$ is oxidised to $Br_2$ which goes into solution as tribromide ions, $Br_3^-$. Some $Br_2$ may migrate into the buffer chamber across the membrane separating the $+^{ve}$ chamber from the buffer chamber. Any bromine present in the buffer chamber will oxidise $S^{2-}$ ions present to form NaBr and sulfur as a precipitate. Any free sulfur which is generated in the buffer compartment may be filtered during the recirculation of the idler electrolyte. One way to overcome the system degradation is to provide that periodically the filter is switched into the circulation of the electrolyte in the $-^{ve}$ chamber. The sulfur is restored by being resolubilized as polysulfide and fed into the electrolyte for reuse.

When the idler electrolyte comprises a mixture of $Na_2S_x$ and NaBr, some $Br^-$ ions will diffuse back into the $+^{ve}$ chamber of the cell and so balance the bromine transported across the membrane by migration from the $+^{ve}$ side of the cell.

In order to enhance the reaction kinetics in the bromine/sulfide system, the $+^{ve}$ electrode may have a coating of non-conductive porous particles selected to increase the available surface area, to increase the surface wettability and to decrease the hydrolysis of bromine. A suitable coating comprises a mixture of silicon dioxide, a zeolite or like silicate in admixture with activated carbon.

The apparatus of the present invention may also be used with the iron-sulfide system described above and detailed in Eq. 3. In carrying out this process the idler electrolyte will generally comprise a salt the anion of which corresponds to that of the ferrous/ferric salts circulating in the $+^{ve}$ chamber. For example if ferrous/ferric chloride salts are used in the electrolyte circulating in the $+^{ve}$ chamber, the idler electrolyte may comprise a chloride, such as NaCl. The cation of the salt will generally be the same as the cation used as the primary charge carrier in carrying out this process. For example the charge balance may be provided by the transport of sodium, potassium, lithium or ammonium ions across the membranes in the cell. Any iron ions and sulfide ions being transported across the membranes from the $+^{ve}$ chamber(s) and $-^{ve}$ chamber(s), respectively, of the cell or cells will react together to form insoluble iron sulfide which forms a precipitate in the idler electrolyte. The precipitate may be removed from the idler electrolyte by means of a suitable filter.

During charging, the charge balancing ions, for example $K^+$ are transported across the membrane from the $+^{ve}$ side to balance the charge and transform $K_2S_5$ to $K_2S$. The sulfur which is present as a doubly charged polysulfide ion $S^{2-}.S_y$, (where $y$ may be as high as 4), is reduced initially to $S^{2-}.S_{y-1}$, and eventually to $S^{2-}$. $Fe^{2+}$ is oxidized to $Fe^{3+}$ which goes into solution and is available to re-oxidize the $S^{2-}$ ions back to sulfur during discharge.

Flow of the electrolytes on both sides of the two or more membranes is provided, preferably a recirculation rather than a once through flow in the majority of end uses. These recirculating electrolytes are stored in independent containers where the quantity may be large enough for the specific requirements of a preferred embodiment. The circulation also allows the electrolytes to be filtered, or otherwise reconstituted on a routine basis without taking the system off-line.

In the iron/sulfide system as the electrolyte in the $+^{ve}$ side is circulated, ferric ions in solution are absorbed at a surface of the $+^{ve}$ electrode and/or in a porous surface layer thereof and replenished at such sites as discharge reduces the ferric to ferrous ions. In addition, the surface of the $+^{ve}$ electrode is preferably coated with an active ingredient, preferably an activated carbon, which augments the iron reaction kinetics. This combination provides iron promptly for the discharge requirements, and thus provides full power until substantially fully discharged. During this discharge the output voltage of the cell is nearly constant, with little polarization loss.

The $-^{ve}$ side preferably has, both for the bromine/sulfide and iron/sulfide reactions, an electrode which absorbs the $S^{-2}$ solution for subsequent discharge and enhances performance similar to that described at the $+^{ve}$ electrode.

Mid electrodes (also defined as intermediate or bipolar electrodes) combine the above such that a $+^{ve}$ electrode is provided on one surface, and a $-^{ve}$ electrode on another surface formed on the same substrate.

Other objects, features and advantages will be apparent from the following detailed description of preferred embodiments thereof taken in conjunction with the accompanying drawings in which:

BRIEF DESCRIPTION OF THE DRAWINGS

FIGS. 1A and 1B are schematic views of the basic components of two cell types (A and B) type A being included for comparative purposes and type B being a preferred embodiment of the invention;

DETAILED DESCRIPTION OF THE PREFERRED EMBODIMENTS

Figure 1C:
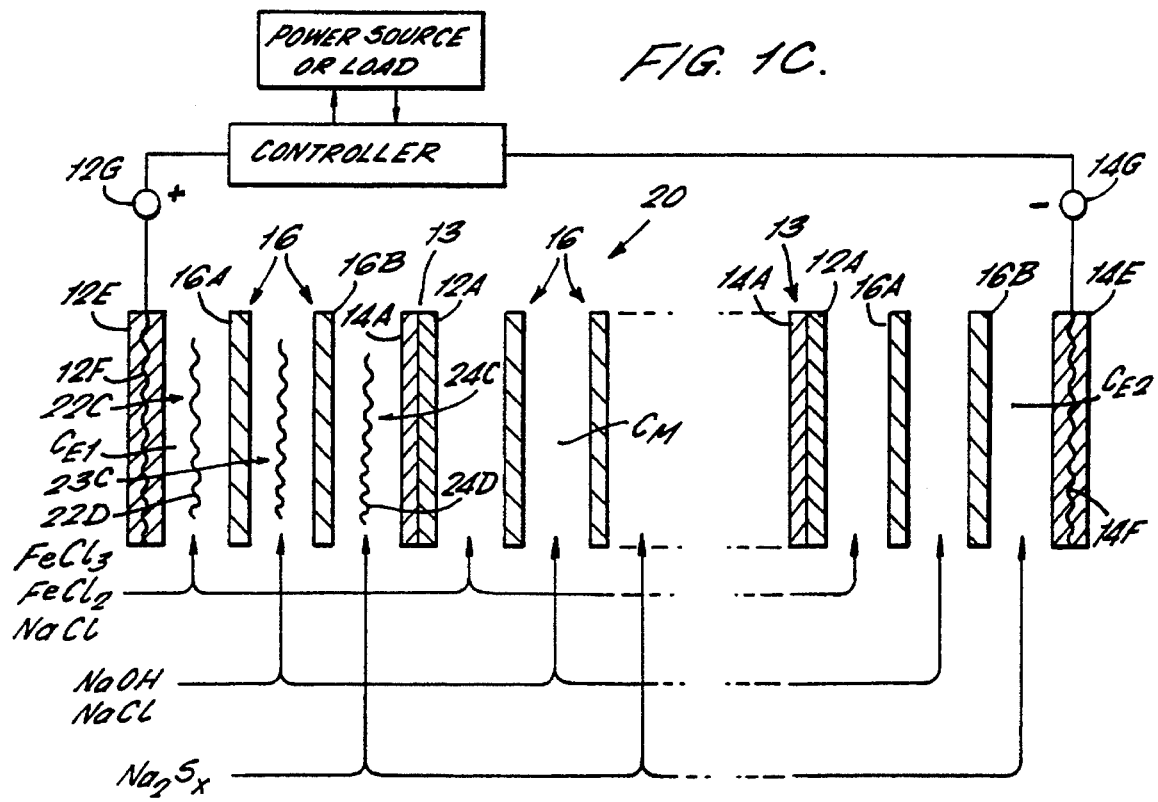
FIG. 1C is diagram of a cell array using the FIG. 1B type B cells.

In the following description of FIGS. 1A to 1E and 2, reference is made to the specific iron/sulfide system utilizing iron chloride, sodium chloride (as the charge carrier) and sodium sulfide. It will be understood, however, that other salts may be substituted for these salts, as appropriate.

Referring to the drawings, FIG. 1A shows for the purposes of comparison Type A cells 10 with a $+^{ve}$ electrode 12 and a $-^{ve}$ electrode 14. A single cation membrane 16 is formed from a heterogeneous structure made by Sybron Chemical Co. called IONAC MC3470. In Type A cells, the single membrane 16 acts to separate the $+^{ve}$ and $-^{ve}$ sides of the cell 10 and is selected to minimize migration of iron from the $+^{ve}$ side to the $-^{ve}$ side and to minimize migration of $S^{-2}$ ions from the $-^{ve}$ to the $+^{ve}$ side. An aqueous solution 22 of $FeCl_3$, $FeCl_2$ and NaCl is provided in a chamber 22C formed between $+^{ve}$ electrode 12 and the membrane 16, and an aqueous solution 24 of $Na_2S_x$ is provided in a chamber 24C formed between the $-^{ve}$ electrode 14 and the membrane 16.

When the cell and the electrolyte system feeding it are in the charged state, a solution of ferric chloride of up to 4.0 molar concentration exists in the chamber 22C of the cell, and a solution of $Na_2S$ at 2.5 molar concentration, exists in chamber 24C of the cell. Typically, each of chambers 22C, 24C has a volume of about 200 cc. The cation membrane 16 allows the passage of charge via the transport of $Na^+$ ions.

FIG. 1A illustrates a cell which does not fall within the scope of the invention and which though rechargeable initially cannot be electrically recharged indefinitely. In this embodiment, the solutions should be periodically reconstituted externally to the cell and replaced. The charge carriers are the sodium ions ($Na^+$) which transfer charge through the membrane 16. During discharge (supplying power to an external load) the $Na^+$ ions are moving from the $-^{ve}$ side to the $+^{ve}$ side through the membrane. The ferric ions, in the $+^{ve}$ side are being reduced to ferrous ions, and the $S^{-2}$ ions in the $-^{ve}$ side are being oxidized to sulfur (which is solubilized by the sodium sulfide). Also during discharge, the $-^{ve}$ ions are trying to move into the $-^{ve}$ side, but little $Cl^-$ is lost since the membrane is a cation exchange membrane.

The cation exchange membrane has to satisfy certain conditions with respect to conductivity and selectivity. It must freely transport $Na^+$ but exhibit a low diffusion rate for Fe cations. However, most cation exchange membranes, even the most selective, have Fe diffusion rates of the order of 500 μg $cm^{-2}$ $h^{-1}$ $mol^{-1}$. This effectively limits the charge/discharge cycles in a single membrane cell as eventually some iron will migrate across the membrane and react with $S^{2-}$ to form an insoluble precipitate in the membrane surface layer.

The FIG. 1B, the Type B cell is electrically rechargeable. This embodiment has, in addition to the two chambers of the type A cell, an additional middle buffer chamber 23C separated from the other two chambers enclosing the electrodes by two cation exchange membranes 16A and 16B. The center chamber has an NaCl and/or NaOH solution 23 circulating through it which does not change composition (an "idler" electrolyte). When charging, Na+ ions are transported from the $+^{ve}$ side, through the middle chamber 23C (both membranes) into the $-^{ve}$ side. However, should any $Fe^{3+}$, $Fe^{2+}$ or $S^{2-}$ ions be transferred to the middle chamber where they react they can be filtered through filter 17 out of the solution. When NaOH is in the middle chamber any $Fe^{3+}$ or $Fe^{2+}$ ions present in that chamber will be precipitated as the hydroxide. There may be a need for pH control in either or both of chambers 22C and 24C as described later.

Using the three chamber rechargeable cell illustrated in FIG. 1B means that any precipitation will occur in the middle chamber, and can be removed without interfering with the main electrolyte flow circuits.

When charging the three chamber cell, $Na^+$ ions are transported across the cation membranes 16A and 16B from the $+^{ve}$ to the $-^{ve}$ side of the cell. The $Na^+$ ions transform the $Na_2S_5$ to $Na_2S$ and in the process S is reduced to $S^{-2}$ ions. At the $+^{ve}$ side ferric ions are produced (via oxidation of the ferrous ions at the $+^{ve}$ electrode 12) and remain in solution 22 (posilyte).

After many cycles, the middle chamber or chambers will accumulate some amount of iron sulfide precipitates, e.g., FeS and $Fe_2S_3$. These materials will eventually need to be removed from the system, or recycled. A method for the recycling or reclamation of these precipitates is shown in FIG. 1E. This method is a totally self contained process (within the energy system) and does not require the introduction of any additional chemical reagents.

As the liquid 23 is circulated to the idler tank chamber 25, it is passed through an ancillary electrochemical cell 27 specifically designed for reclamation. The $-^{ve}$ electrode 29 of this cell is porous carbon which will collect the iron sulfide precipitates as a filter in the stream of the liquid 23. The $+^{ve}$ electrode 30 is a lightly surfaced carbon composite substrate.

If the liquid 23 in the middle chamber 23C is an NaCl or KCl solution, electrolysis will generate iron within the porous carbon $-^{ve}$ electrode and $H_2S$ at the $+^{ve}$ electrode. The $H_2S$ is vented from cell 27 as a gas along line 31 back into the − electrolyte of the power cell where it reacts with NaOH or KOH to form $Na_2S$ or $K_2S$, respectively, for reuse as the energy storing reagents in the electrolyte. The reaction within the reclamation cell is as follows:

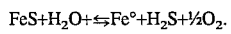

$$FeS + H_2O \rightleftharpoons Fe° + H_2S + \tfrac{1}{2}O_2. \qquad \text{Eq. 3A}$$

The plated iron, Fe°, is later removed by the direct action of $Fe^{3+}$ ions in the positive side of the power cell by hydraulically switching the reclamation cell into the $+^{ve}$ electrolyte line.

If the liquid 23 in the middle chamber 23C is an NaOH or KOH solution, the reaction with the reclamation cell is:

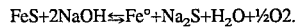

$$FeS + 2NaOH \rightleftharpoons Fe° + Na_2S + H_2O + \tfrac{1}{2}O2. \qquad \text{Eq. 3B}$$

When providing power, the cell is discharging. In both type A and type B cells, similar reactions occur at the two electrodes. At the $+^{ve}$ side electrode 12, ferric ions are reduced to ferrous ions, $Fe^{3+}$ to $Fe^{2+}$, and an electron is acquired from the external circuit. At the $-^{ve}$ electrode 14 sulfide ions are oxidized to molecular sulfur which is solubilized by the sodium sulfide. The electrons produced at the $-^{ve}$ electrode form the current through a load. The chemical reaction at the $+^{ve}$ electrode produces 0.7 to 0.75 volts (open circuit) and the chemical reaction at the $-^{ve}$ electrode produces 0.45 volts (open circuit). The combined reaction produces 1.15 to 1.20 volts per cell (open circuit).

FIG. 1C shows a cell array 20 of multiple cells connected in electrical series and fluid parallel. End electrodes 12E ($+^{ve}$) and 14E ($-^{ve}$) and multiple mid-electrodes 13 (each one having a $+^{ve}$ electrode portion 12A and $-^{ve}$ electrode portion 14A) are spaced out from each other by membranes 16 and screen or mesh spacers 22D, 24D in all the cell chambers 22C, 24C, (portions of two of which 22D, 24D are shown by way of example) to form end cells $C_{E1}$ and $C_{E2}$ and an array of n# of mid cells $C_M$ (typically 10–20; but note much smaller and much higher numbers of cells can be accommodated). The end electrodes 12E ($+^{ve}$) and 14E ($-^{ve}$) have internal conductors 12F and 14F (typically copper screens) encapsulated therein and leading to external terminals 12G, 14G which are connected to external loads (e.g. to a motor M via a control circuit CONT, the motor driving a vehicle) or to power sources (e.g. a utility power grid when used as a load levelling device).

Figure 1D:
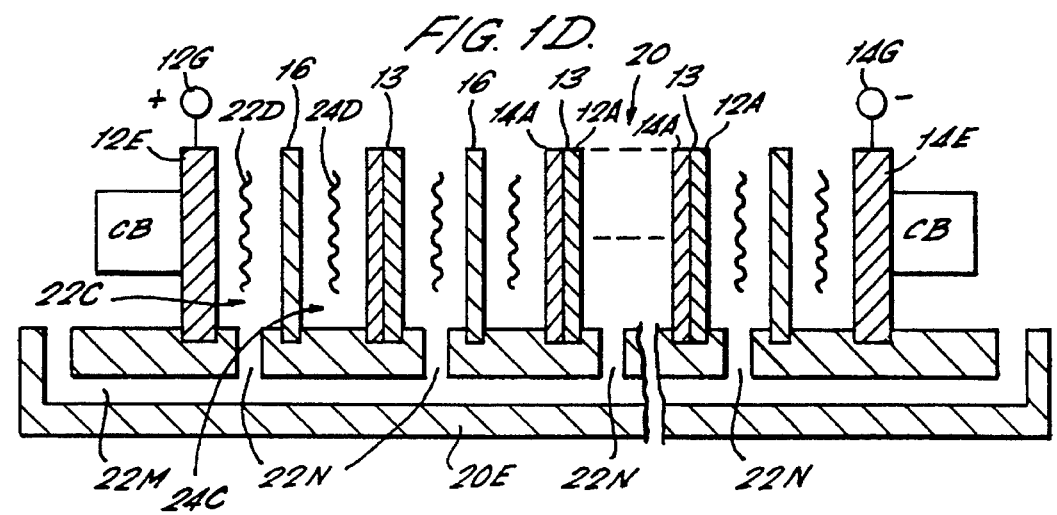
FIG. 1D shows an encapsulation of an array of cells.
Figure 1E:
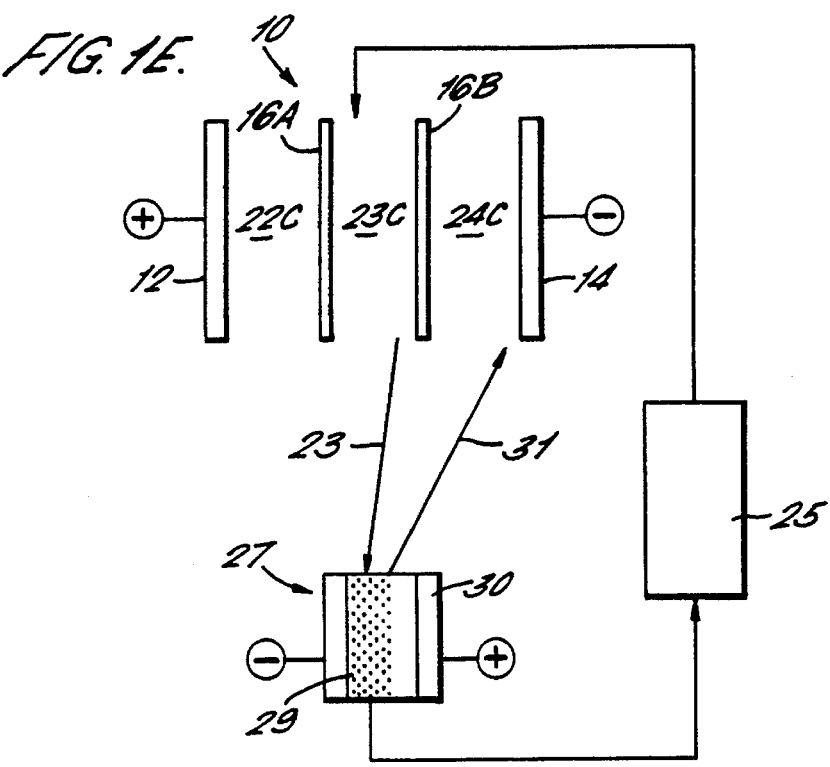
FIG. 1E shows a reclamation technique.

FIG. 1D shows the manner of encapsulating a cell array such as that of FIG. 1C. A cell array 20 (such as shown in FIG. 1C) is held between clamping blocks CB and dipped at one edge into a shallow container having a bath of liquid epoxy resin (not shown) therein. The epoxy resin hardens to form a wall of the battery. Flow conduits such as manifold 22M with feed tubes 22N for the FeCl$_3$/NaCl solution feed are provided (a similar arrangement (not shown) being provided for the sodium sulfide solution feed). These flow conduits are simultaneously encapsulated with the electrode and membrane edges.

The cell array is rotated 90 degrees and the process repeated three times to form four long walls. Manifolds and tubes for electrolyte withdrawal are provided at the top face. Additional encapsulation can be provided at the backs of end electrodes 12E, 14E.

An alternative approach to encapsulation is to use a dissolvable or low melting point solid to fill the cell chambers 22C, 24C, and the manifolds and tubes of essentially all cells of battery 20. The battery is then dipped in its entirety into a deep epoxy resin bath. After the epoxy resin hardens, the battery is subjected to water or other solvent fed through its circulatory path to dissolve the solid, or is heated to melt the solid.

Another effective encapsulation approach is a plate and frame structure (not shown) which has enough short-term sealing integrity to permit a single pouring of encasing polymer (epoxy). The polymer provides the long-term sealing along all edges of the electrodes and membranes.

In either embodiment of encapsulation the goal is to safeguard against: (a) cell to cell leakage; (b) leakage between tubes and between manifolds; (c) leakage to the environment; and (d) to provide short lengths of narrow cross section tubes.

Figure 2:
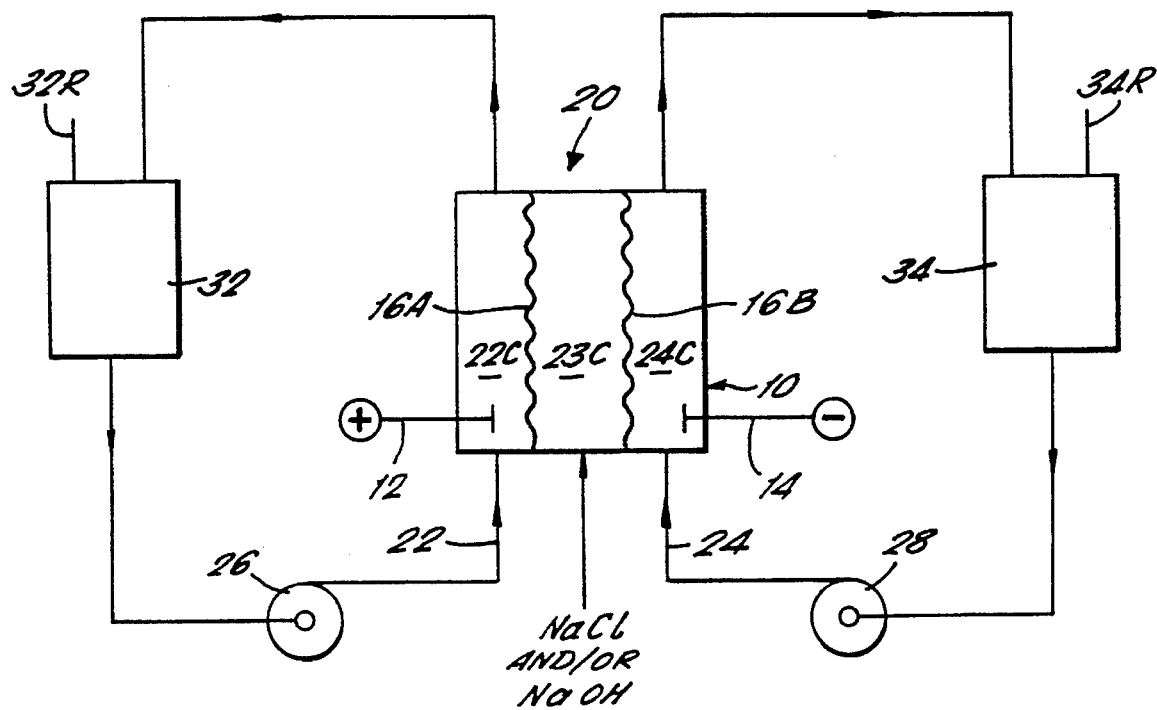
FIG. 2 is a block diagram of a full system using the cells of FIG. 1B.

FIG. 2 shows a free flow system, a power generation/storage system utilizing one or more of the cells or cell array formats 20. Each cell 10 receives electrolyte through pumps 26 and 28 for the FeCl$_3$/NaCl and Na$_2$S$_5$ solutions (22 and 24, respectively). The electrolytes 22 and 24 are stored in containers 32 and 34 large enough for the needs of a particular job. The tanks 32, 34 can be replaced with freshly charged electrolyte by substituting tanks containing fresh electrolyte and/or refilling them from charged supply sources via lines 32R, 34R with corresponding lines (not shown) provided for draining spent (discharged) reagent.

Figure 3A:
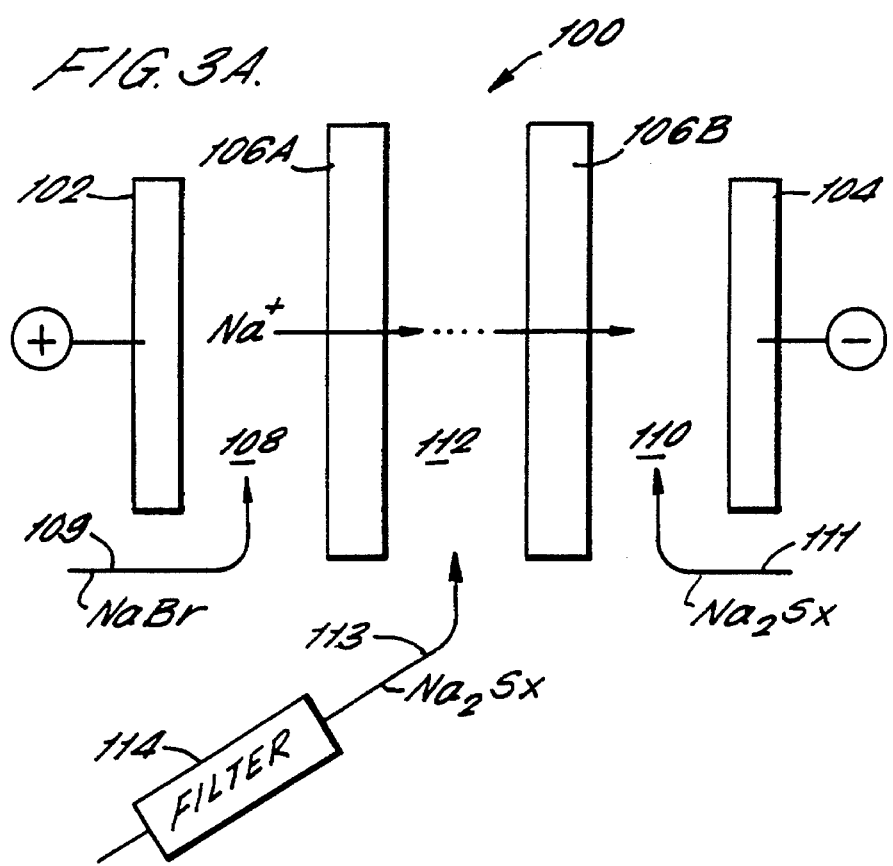
FIG. 3A is a schematic view of a cell for use in the bromine/sulfide system containing a single buffer chamber.
Figure 3B:
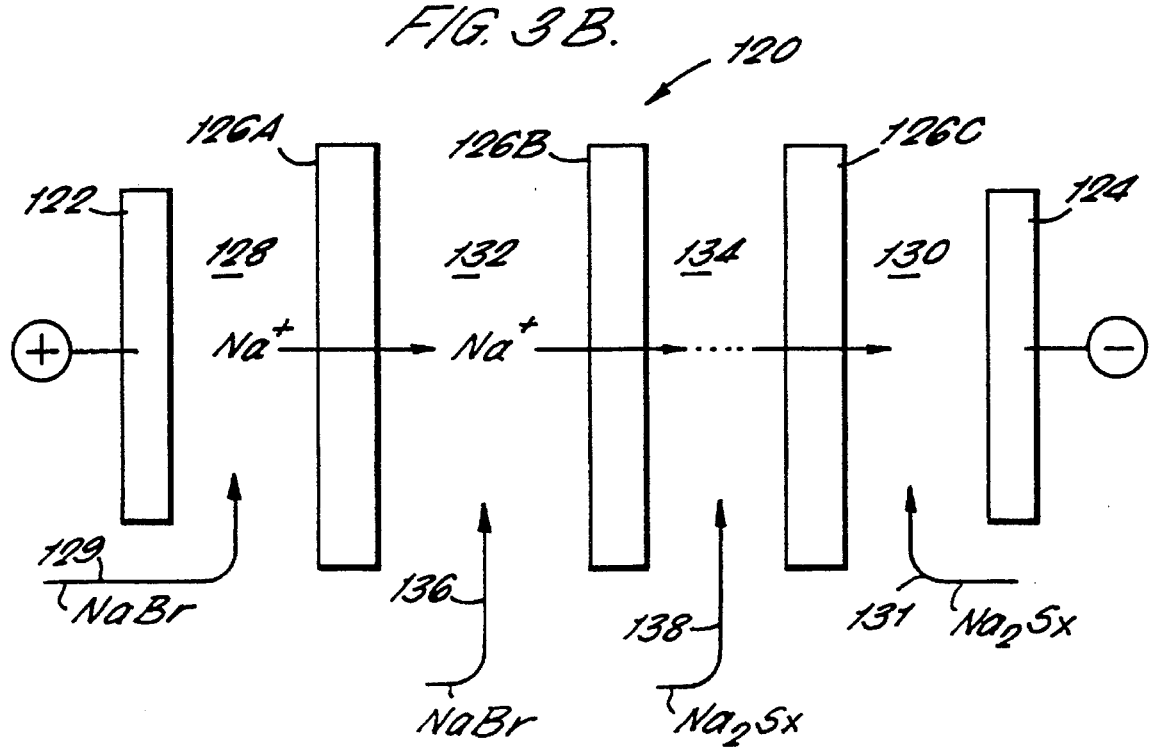
FIG. 3B is a schematic view of a cell for use in the bromine/sulfide system containing two buffer chambers.

FIGS. 3A and 3B illustrate the specific system using sodium bromide and sodium sulfide. It will be understood, however, that other salts may be substituted for these salts, as appropriate.

Referring to the drawings, FIG. 3A illustrates a single cell 100 with a $+^{ve}$ electrode 102 and a $-^{ve}$ electrode 104. Cation exchange membranes 106A and 106B separate the $+^{ve}$ chamber 108 of the cell 108 from the $-^{ve}$ chamber 110 of the cell and form the buffer chamber 112. The electrolyte circulating via the chamber 108 is NaBr fed along line 109, whilst the electrolyte circulating via the chamber 110 is Na$_2$S$_x$ fed along line 111.

Membranes 106A and 106B may be the same or different cation exchange membranes. Membrane 106A is in contact with bromine/bromide and must be resistant to attack by bromine at acid pH's. A preferred membrane for use on this side of the cell is a fluorocarbon polymer structure (having high chemical resistance to bromine) grafted with styrene via gamma irradiation and functionalized with sulfonic acid or carboxylic acid groups to provide charge carriers.

Membrane 106B may be the same as membrane 106A, but since it does not contact the bromine side of the cell a membrane that is not resistant to attack by bromine may be used. Examples of alternative membranes for use are NAFION (DuPont) or IONAC MC3470 (Sybron Chemical Co.).

The center buffer chamber 112 of the cell has an Na$_2$S$_x$ idler electrolyte circulating through it. When charging, Na$^+$ ions are transported from the $+^{ve}$ side 108, through the buffer chamber 112 (both membranes) to the $-^{ve}$ side 110 of the cell. On discharge, the opposite occurs with the Na$^+$ ions being transported from the $-^{ve}$ side 110 to the $+^{ve}$ side 108 of the cell. Any bromine which migrates through membrane 106A will be retained in the idler electrolyte where it will oxidise any S$^{2-}$ and/or HS$^-$ ions which migrate through the membrane 106B to form NaBr and sulfur as a precipitate. The free sulfur precipitated in the idler electrolyte 113 may be removed by filtration through filter 114 as the electrolyte is recirculated to the buffer chamber 112. The rate of flow of the idler electrolyte through the buffer chamber 112 may be slower than the rate of flow of the electrolytes through the $-^{ve}$ chamber 110 and the $+^{ve}$ chamber 108, providing that it is sufficiently fast to prevent any precipitated sulfur from clogging the pores of the membranes 106A and 106B.

It will be appreciated that the amount of bromine and the amount of S$^{2-}$ and/or HS$^-$ ions which migrate across membranes 106A and 106B, respectively, will not generally be equivalent and one of these species will therefore generally be in excess in the idler electrolyte. Because S$^{2-}$ and/or HS$^-$ ions tend to migrate more readily across cation exchange membranes than bromine, S$^{2-}$ ions are most likely to be in excess in the idler electrolyte. The excess S$^{2-}$ ions can be oxidized to sulfur and precipitated and then filtered out of the idler electrolyte stream 113 by the filter 114.

Referring to FIG. 3B, a single cell 120 is illustrated with a $+^{ve}$ electrode 122 and a $-^{ve}$ electrode 124. Cation exchange membranes 126A, 126B and 126C separate the $+^{ve}$ chamber 128 of the cell from the $-^{ve}$ chamber 130 of the cell and thereby form a first buffer chamber 132 between membranes 126A and 126B and a second buffer chamber 134 between membranes 126B and 126C. The electrolyte circulating via the chamber 128 is NaBr fed along line 129, whilst the electrolyte circulating via the chamber 130 is Na$_2$S$_x$ fed along line 131.

Membranes 126A, 126B and 126C may be the same or different cation exchange membranes as described with reference to FIG. 3A.

The first buffer chamber 132 has an idler electrolyte 136 circulating through it which preferably is NaBr, whilst the second buffer chamber 134 has an idler electrolyte 138 circulating through it which is preferably $Na_2S_x$. When charging $Na^+$ ions are transported from the $+^{ve}$ side 128, through the buffer chambers 132 and 134 (all three membranes) to the $-^{ve}$ side 130 of the cell. Any bromine migrating through membrane 126A will mainly be retained in the idler electrolyte 136, although some bromine may migrate across membrane 126B into buffer chamber 134. Any $S^{2-}$ and/or $HS^-$ ions migrating across membrane 126C will be retained in the idler electrolyte 138, although some $S^{2-}$ or $HS^-$ ions may migrate across membrane 126B into buffer compartment 132. Where bromine encounters $S^{2-}$ or $HS^-$ ions it will oxidize these ions to form NaBr and sulfur which is precipitated. Any free sulfur which is precipitated may be removed by filtration of the idler electrolyte(s) through a filter (not shown). The rate of flow of the idler electrolytes through the buffer chambers 132 and 134 may be slower than the rate of flow of the electrolytes through the $+^{ve}$ chamber 128 and the $-^{ve}$ chamber 130, providing that the rates of flow are sufficiently fast to prevent any precipitated sulfur from clogging the pores of the membranes 126A, 126B and 126C.

It will be appreciated that the $S^{2-}$ and/or $HS^-$ ions which migrate across membrane 126C into buffer chamber 134 will generally be in excess of any bromine migrating across membranes 126A and 126B. Accordingly, $S^{2-}$ ions are likely to be in excess in buffer chamber 134 and these excess $S^{2-}$ ions can be oxidized to sulfur and precipitated and then filtered out of the electrolyte stream 138.

Fabrication of Electrodes

End electrodes differ from the mid electrodes because they must have a metallic conductor embedded within the structure running across the electrode area. This is required because the resistivity of the substrate material from which they are formed is too high to allow adequate electrical conduction to an external electrical connector. For example a 2.5 cm by 2.5 cm (10 inch by 10 inch) square of substrate material of 0.25 cm (0.10 inch) thickness will have a resistance of about 10 ohms where a corresponding cell has an internal resistance of about 0.01 ohms. A sheet of copper of 0.025 cm (0.01) inch thickness with approximately the same area embedded into the electrode will reduce the effective electrode resistance to about 100 micro ohms. The end electrodes are unipolar, whereas the mid-electrodes are bipolar. The conductor sheet is a thin screen structure embedded along the length of the end electrodes which make mechanically good contact along the current path.

The process of making the bipolar mid-electrodes is as follows. Substrates are formed of graphite flakes mixed with a plastic binder or other suitable binder, generally in a 1:1 weight ratio of such components. The mixture is freed from moisture by heating and/or desiccation methods, formed as sheets and hot pressed at temperatures and pressures appropriate to the materials used.

Then the substrates are coated on both the $-^{ve}$ and $+^{ve}$ surfaces with activated carbon particles by placing a sprinkling of such particles on mold plate surfaces and hot pressing the substrate to complete sealing of all voids in the substrate and to embed the particles in its surfaces. Suitable types of activated carbon for use in surfacing the electrodes are G212 of North American Carbon Co., UU of Barnebey-Cheney Co., GAC of Calgon Carbon Co., or PCB of Calgon Carbon Co.

After each pressing step, the press mold and its contents are cooled under pressure by using a water cooled heat exchanger to safeguard against bowing or warping and also to ensure a compact, non-porous structure.

End electrodes are prepared by making substrate by mixing graphite flakes and a plastic binder together, in the same general manner as described for the process of making bipolar mid-electrodes.

These substrates are then formed into a sandwich with a conductive screen, e.g. a copper screen, placed therebetween. This assembly is hot pressed to form the end electrode substrate and cooled under pressure to minimize warping.

One surface of this substrate is then surfaced with activated carbon or silicon dioxide particles, or a mixture of silicon dioxide/activated carbon particles, depending on whether a $-^{ve}$ electrode or a $+^{ve}$ electrode is being formed. This is effected by placing a sprinkling of the required particles (activated carbon or silicon dioxide) on the electrode surface and hot pressing to embed the particles in the surface thereof. After each pressing step the press mold and its contents are cooled, for example using a water-cooled heat exchanger to safeguard against bowing or warping.

Membranes

The preferred cation exchange membrane for use in the iron/sulfide of the present invention is a heterogeneous structure made by Sybron Chemical Co. called IONAC MC3470. This is a cation exchange membrane containing sulfonated resins as the functional materials bonded together with Kynar. The material is bonded to a fibrous support sheet of glass cloth or polymer fiber. The specifications for this membrane are: 0.040 cm (0.016 inches) thick, 96% permselectivity and 5 ohms/square cm in 1N NaCl.

The preferred membrane for use in the bromine/sulfide system of the present invention, particularly for the membrane which contacts the bromine side of the cell is a cation exchange membrane formed from a fluorocarbon polymer grafted with styrene via gamma irradiation and functionalized with sulfonic acid or carboxylic acid end groups. The fluorocarbon is preferably a fluorinated ethylene-propylene copolymer. The membrane is prepared by grafting the styrene onto the fluorocarbon polymer using gamma irradiation and then sulfonating the grafted polymer, for example by using chlorosulfonic acid or functionalizing with carboxylic acid groups.

This membrane is preferably from 0.005 to 0.0175 cm (0.002 to 0.007 inches) thick, more preferably about 0.0125 cm (0.005 inches) thick. The membranes are made from an ethylene-propylene copolymer base film of the desired thickness which is grafted with styrene via gamma irradiation, for example from a cobalt-60 source. The radiation grafting of vinyl-substituted monomers to polyolefin films is known in the art and reference is made to U.S. Pat. Nos. 4,230,549 and 4,339,473.

The gamma irradiation of the fluorocarbon polymer forms free radical sites which are then available for reaction with the styrene monomer. The electrical resistance of the ion exchange membrane is directly related to the percentage of styrene grafted thereon when subsequently sulfonated, the electrical resistance decreasing as the percent graft increases. In general the useful range of the percent graft is from 10% to 35%, more preferably 10% to 20%. Percent graft is defined as the weight increase due to grafting divided by the initial weight of the polymer film multiplied by 100.

The electrical resistance of the membrane is also related to the percentage of sulfonation which will generally be in the range of from 5% to 30%, more preferably 12% to 20%, the electrical resistance decreasing as the percentage of sulfonation increases.

Compensation for Migration

Because water is transferred across the membrane by osmosis or electro-osmosis, it becomes necessary to correct for this happening. This is accomplished by reverse osmosis, by evaporation of water from the appropriate electrolyte or by electrodialysis.

Specific Embodiments

The present invention will be further described with reference to the following non-limiting Examples. Examples 1 and 2 are comparative Examples carried out in cells with single membranes only. In these comparative Examples the cell tests were conducted as primary devices, i.e. discharge only modes.

EXAMPLE 1

Fabrication of End Electrodes

Two substrates were prepared by mixing graphite flakes (#4012 graphite flakes of Asbury Carbon Co.) with a polyvinylidene fluoride, PVDF, binder (Penwalt's #461) in a 1:1 weight ratio. The mixture was heated to remove moisture, formed into sheets and hot pressed at a temperature of 177° C. (350° F.) and a pressure of 1723 kPa (250 psi) for 10 minutes, and then cooled at the same pressure between water cooled platens.

A stack was then formed, from bottom to top, of an aluminum base plate, Teflon sheet, substrate, a copper screen (0.025 cm thick), the other substrate, a Teflon sheet, high temperature rubber sheet, and finally another aluminum base plate. The assembly was then pressed at 1034 kPa (150 psi) at 177° C. (350° F.) for 10 minutes, and then cooled at the same pressure between water-cooled platens.

The substrate to be surfaced had its edges covered with tape and was placed on an aluminum base plate covered with a Teflon sheet, and a mixture of 80% graphite and 20% Kynar sprinkled over the surface. The surface of the substrate was then sprinkled with a layer of activated carbon particles (G212 of North American Carbon Co., or UU of Barnebey-Cheney Co.).

A high temperature rubber sheet was placed on top of the surfaced substrate, followed by a Teflon sheet and an aluminum base plate. The structure was then pressed at 517 kPa (75 psi) at 177° C. (350° F.) for 10 minutes, and then cooled at the same pressure between water-cooled platens.

The tape was then removed from the edges of the surfaced side and a rubber "picture" frame placed on top of the cleared border. The electrode was then placed with the surfaced side uppermost onto an aluminum base plate covered with a Teflon sheet and the top surface of the structure covered with a Teflon sheet and an aluminum base plate. The edges of the assembly were pressed at 2413 kPa (350 psi) at 177° C. (350° F.) for 210 minutes, and then cooled at the same pressure between water-cooled platens. This step sealed the substrate sheets along the edges in order to ensure that the copper screen was totally encapsulated to prevent corrosion by the electrolyte.

Cell Fabrication

A sealed single cell was made by placing a $+^{ve}$ electrode and a $-^{ve}$ electrode together with an IONAC MC3470 membrane therebetween. The four edges of the cell were cast with an epoxy resin to encapsulate the cell and ports formed to allow the electrolytes to be supplied to and to be removed from the cell.

The construction of the cell ensures that the copper screens and the wires attached, which make electrical contacts to the cell, do not contact the electrolyte.

Cell Performance

The above described cell was used, with UU carbon surfaced electrodes, spaced apart 1.25 cm (0.50 inch), with the space between the electrode surface and membrane on each side being filled with G-212 porous carbon. The active area of the cell was 129 sq. cm. (20 sq. in.). The electrolytes were:

| | |
|---|---|
| Positive side | 100 cc of 3 molar solution of $FeCl_3$ |
| Negative side | 100 cc of 2 molar solution of $Na_2S$ |
| Cell resistance | 0.2 ohms |

Both solutions were in the charged state initially, and the cell was set up to be discharged only.

The maximum coulombic capacity of the cell assuming that the reaction to the pentasulfide shown below

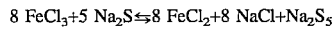

$$8\ FeCl_3 + 5\ Na_2S \rightleftharpoons 8\ FeCl_2 + 8\ NaCl + Na_2S_5 \qquad \text{Eq. 7}$$

goes to completion was:

| | |
|---|---|
| $+^{ve}$ side | 7.8 AH |
| $-^{ve}$ side | 9.6 AH |

The capacity was limited, in these examples, by the amount of $FeCl_3$ in solution in the positive side.

Four discharges were conducted, with the electrolyte being replaced after each discharge. Electrolyte replacement was accomplished by draining the cell compartments and refilling the compartments with fresh solutions three times in order to flush out the "spent" reagents within the surface pores of the porous G-212 carbon.

Table 1 gives the data obtained from these experiments.

TABLE 1

| Discharge Data at The 2.0 Ampere Rate | | |
|---|---|---|
| Cycle # | AH Output | % of Reagent $Fe^{3+}$ Utilization |
| 1 | 5.5 | 71 |
| 2 | 5.0 | 64 |
| 3 | 5.2 | 67 |
| 4 | 4.8 | 62 |

EXAMPLE 2

A cell was constructed in the manner as described in Example 1 except that the electrode-to-electrode spacing was 1.25 cm (0.40 inch). Even though the cell had static electrolytes (non-circulating) the solutions were stirred or agitated periodically to ensure adequate mixing and physical availability of ionic species at the electrode surfaces. The active area of the cell was 129 sq. cm. (20 sq. in.) with excess cell volume to accommodate additional electrolyte.

The electrolytes were:

| | |
|---|---|
| Positive side | 200 cc of 3 molar solution of $FeCl_3$ |
| Negative side | 200 cc of 2 molar solution of $Na_2S$ |
| Cell resistance | 0.08 ohms |

Both solutions were in the charged state initially, and the cell was set up to be discharged only.

The maximum coulombic capacity of the cell, assuming that the reaction to the pentasulfide shown in Eq. 7 goes to completion was:

| | |
|---|---|
| $+^{ve}$ side | 15.6 AH |
| $-^{ve}$ side | 19.2 AH |

The capacity was limited, in these examples by the amount of $FeCl_3$ in solution in the positive side.

Two discharges were conducted, with the electrolyte being replaced after each discharge. The first discharge was at a 2 amp rate, and the second at a 4 amp rate. The discharge was quite flat to over 90% depth of discharge. Charge output was approximately 9 AH at useful voltages.

Figure 4:
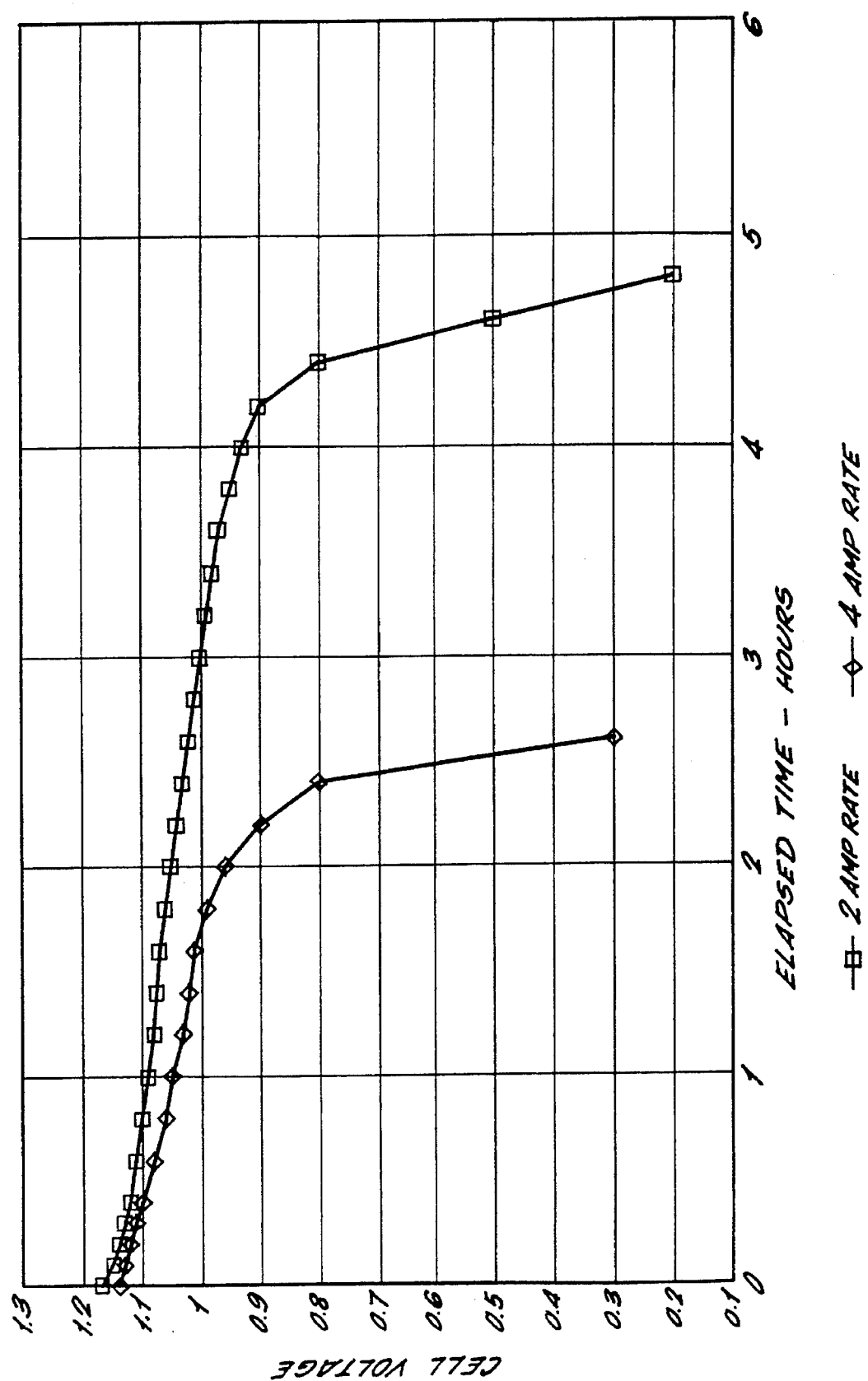
FIG. 4 is a graph of certain cells during discharge.

FIG. 4 is the discharge curve for the first cycle and is typical of the shape of the discharge curve for non-circulating electrolytes with adequate agitation or stirring. At various times during the discharging attempts were made to recharge the cell by connecting the $+^{ve}$ and $-^{ve}$ electrodes of the cell to the $+^{ve}$ and $-^{ve}$ terminals, respectively, of a DC power supply. Within 10 to 20 seconds at less than 1 amp initial current, the cell resistance rose from its 0.2 ohms to over 100 ohms, and current diminished to less than 10 ma. Cell resistance continued to rise as long as the "charging" power supply was connected to the terminals.

Upon removal of the charging circuit and replacing the electrical load, the cell resistance decreased to its normal 0.2 ohm value, and discharging proceeded as usual. There were no observable remaining effects within the membrane as a result of the attempts to recharge electrically. Since the available sodium ion concentration in the $+^{ve}$ side is low, $Fe^{3+}$ ions will tend to be the predominant charge carriers during "recharge". However, since substantially no $Fe^{3+}$ ions are transported across the membrane, the cation exchange membrane is rendered essentially non-conductive in the absence of charge carrying ions.

EXAMPLE 3

Cell tests in the previous two examples were conducted as primary devices, e.g. only discharge modes. These cells are essentially non-chargeable devices because of the necessary limitations imposed by the membrane resistance to $Fe^{3+}$ transport and by the need to keep the two electrolytes apart. Only sodium ions can be allowed to migrate across the membrane during both charge and discharge with the $Fe^{3+}/S^{2-}$ couple.

In order to recharge this system electrically an ionic salt needs to be present in the $+^{ve}$ chamber during recharging and, furthermore, a multiple chamber configuration is preferable.

A cell was assembled to characterize a rechargeable version of the above couple. The cell had static electrolytes (non-circulating) and three compartments. The $+^{ve}$ compartment contained the oxidizing agent, $FeCl_3$, and NaCl in aqueous solution and the $+^{ve}$ electrode. The $-^{ve}$ compartment contained the reducing agent, $Na_2S$, in aqueous solution and the $-^{ve}$ electrode. A middle compartment was an isolation chamber or buffer compartment. It contained a 2 molar solution of NaCl. Each of the three compartments was separated by a cation exchange membrane. The physical parameters of the cell were as follows:

Single cell consisting of two identical end electrodes and two cation exchange membranes.

| | |
|---|---|
| Membranes | SYBRON Cation membranes |
| Electrodes | UU carbon surfaced surfaced substrate, | prepared as described in Example 1

| | |
|---|---|
| Compartment spacing for electrolytes | 1.25 cm (0.50 inch) |
| Active area | 129 sq. cm. (20 sq. in.) |

Electrolytes were:

| | |
|---|---|
| Positive side | 200 cc of 3 molar solution of $FeCl_3$ and 1.5 molar solution of NaCl |
| Negative side | 200 cc of 2 molar solution of $Na_2S$ |
| Middle compartment | 200 cc of 2 molar NaCl |
| Cell resistance | 0.1 ohms |

Both solutions were in the charged state initially.

The maximum coulombic capacity of the cell, assuming that the reaction to the pentasulfide shown in Eq. 7 goes to completion was:

| | |
|---|---|
| $+^{ve}$ side | 15.6 AH |
| $-^{ve}$ side | 17.9 AH |

The capacity was limited, in these examples by the amount of $FeCl_3$ in solution in the positive side.

Three partial cycles were run with the same electrolyte. Table 2 gives the data obtained from these experiments.

TABLE 2

| | Discharge Data at The 2.0 Ampere Rate | | | |
|---|---|---|---|---|
| Cycle # | AH Output | AH Input | AH Efficiency | % of Reagent $Fe^{3+}$ Utilization |
| 1 | 10 | 12 | 83 | 64 |
| 2 | 12 | 14 | 86 | 77 |
| 3 | 9 | 11 | 82 | 58 |

Examination of the middle chamber electrolyte after the three discharges showed virtually no discoloration from the initial colorless and clear appearance. Only a very slight cloudiness was detected which might indicate some presence of free sulfur or other insoluble compounds such as iron sulfide compounds.

EXAMPLE 4

A three compartment cell was constructed with a UU carbon surfaced $-^{ve}$ electrode and a GAC carbon surfaced $+^{ve}$ electrode. The electrodes were separated by two Nafion 117 membranes to form the three compartment cell, the spacings between cell components were 0.25 cm from $-^{ve}$ electrode to membrane, 0.62 cm between membranes and 0.25 cm from $+^{ve}$ electrode to membrane. The active area of the cell was 155 cm².

The electrolytes were:

| Positive side | 150 cc of solution of 3 molar FeCl$_3$ and 150 cc of 2 molar NaCl |
|---|---|
| Negative side | 300 cc of 1.25 molar solution of Na$_2$S$_5$ |
| Buffer chamber | 350 cc of 2 molar NaCl |

The electrolytes were recirculated through the respective cell chambers.
The cell resistance was 106 milliohms.

Figure 5:
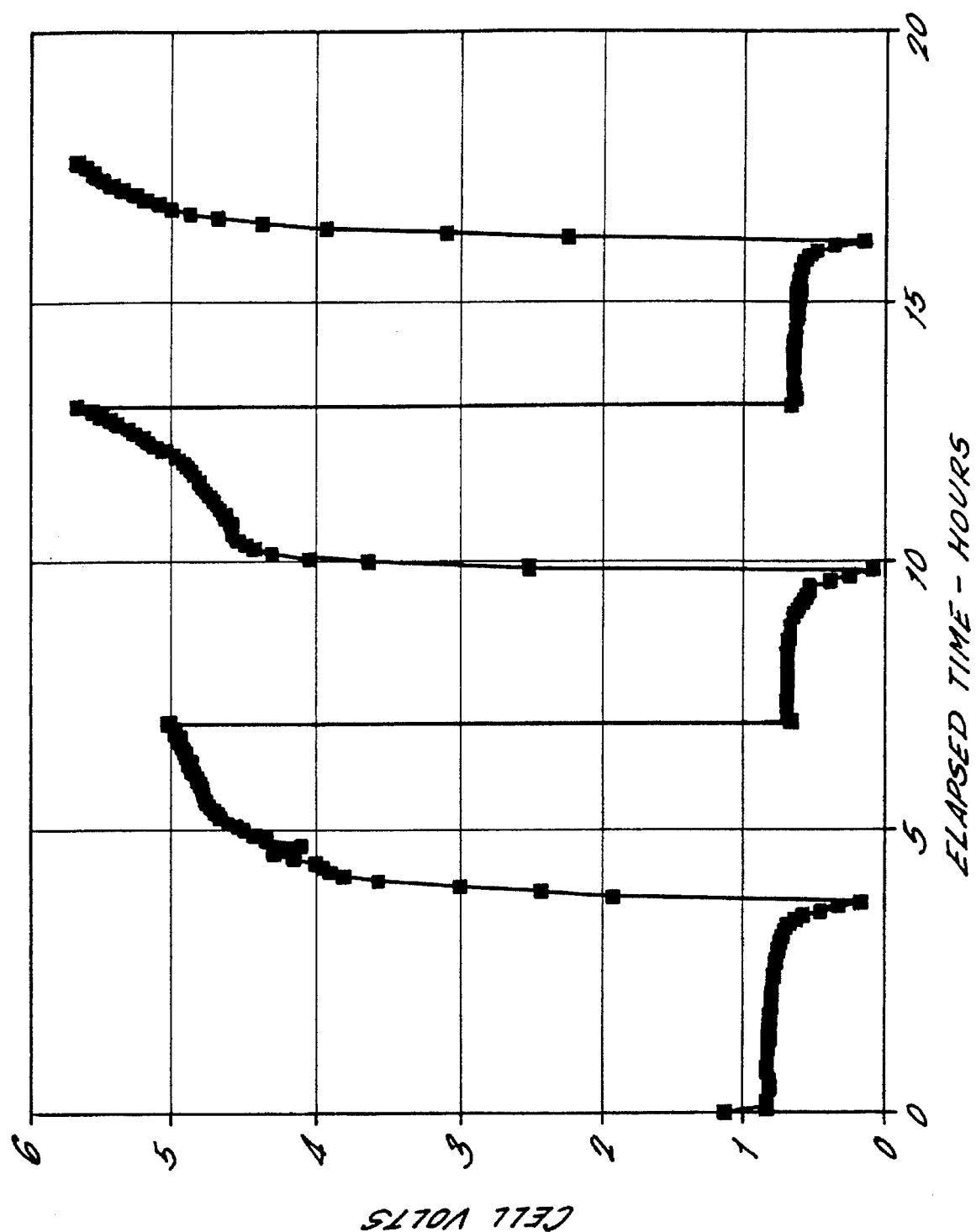
FIGS. 5–8 are graphs showing performances of certain cells during charge/discharge.

Both electrolytes were in the charged state initially. The cell was discharged and charged over three cycles at 3 amps. The results are given in FIG. 5. It can be seen from these results that the charging potentials indicate a very large increase in resistance.

EXAMPLE 5

A three compartment cell was constructed with two UU carbon surfaced electrodes separated by two Nafion 117 membranes. The cell component spacings were 0.25 cm from $-^{ve}$ electrode to membrane, 0.62 cm between membranes, and 0.25 cm from $+^{ve}$ electrode to membrane. The active area of the cell was 155 cm.

The electrolytes were:

| Positive side | 500 cc of 6 molar NaBr |
|---|---|
| Negative side | 300 cc of 0.75 molar Na$_2$S$_5$ |
| Buffer chamber | 400 cc of 3 molar NaBr |

Figure 6:
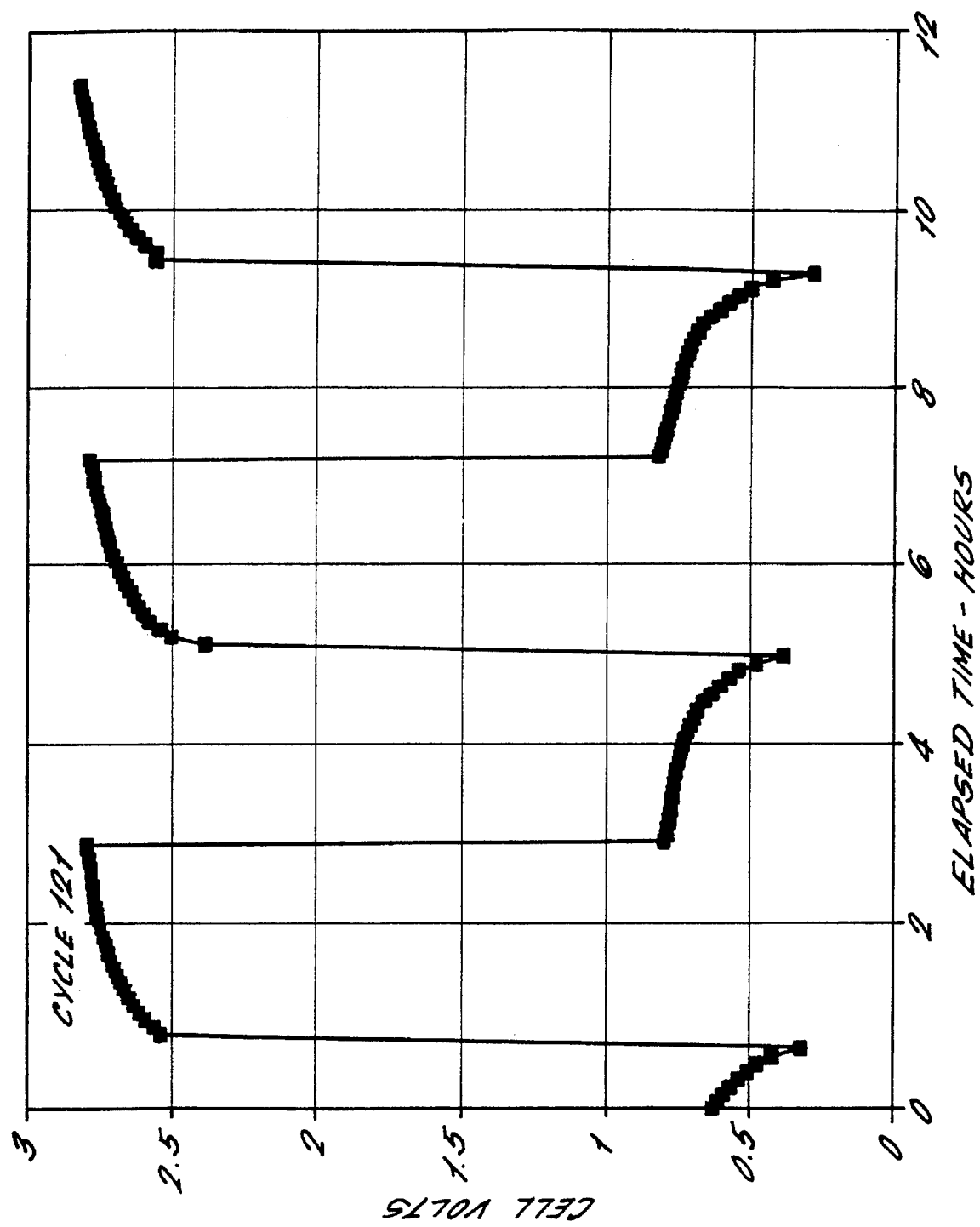

The cell was run for over 250 cycles.
The cell resistance was initially 206 milliohms. Periodically sulfur was added to the $-^{ve}$ chamber of the cell to compensate for sulfur losses from that chamber into the buffer chamber, since no steps were taken in this Example to recover the sulfur from the idler electrolyte in the sulfur chamber. The water levels in the $+^{ve}$ and $-^{vc}$ chambers were also periodically balanced. The typical performance of the cell on charge/discharge at 6 amps over cycles 121, 122 and 123 is shown in FIG. 6 of the accompanying drawings.

EXAMPLE 6

A three compartment cell was constructed with a UU carbon surfaced $-^{vc}$ electrode and a PCB carbon surfaced $+^{ve}$ electrode separated by two Nafion 117 membranes. The electrode spacing was as in Example 4. The active area of the cell was as in Example 4.

The electrolytes were:

| Postive side | 500 cc 6 molar NaBr |
|---|---|
| Negative side | 400 cc 1.5. molar Na$_2$S$_5$ |
| Buffer chamber | 400 cc 3 molar NaBr |

Figure 7:
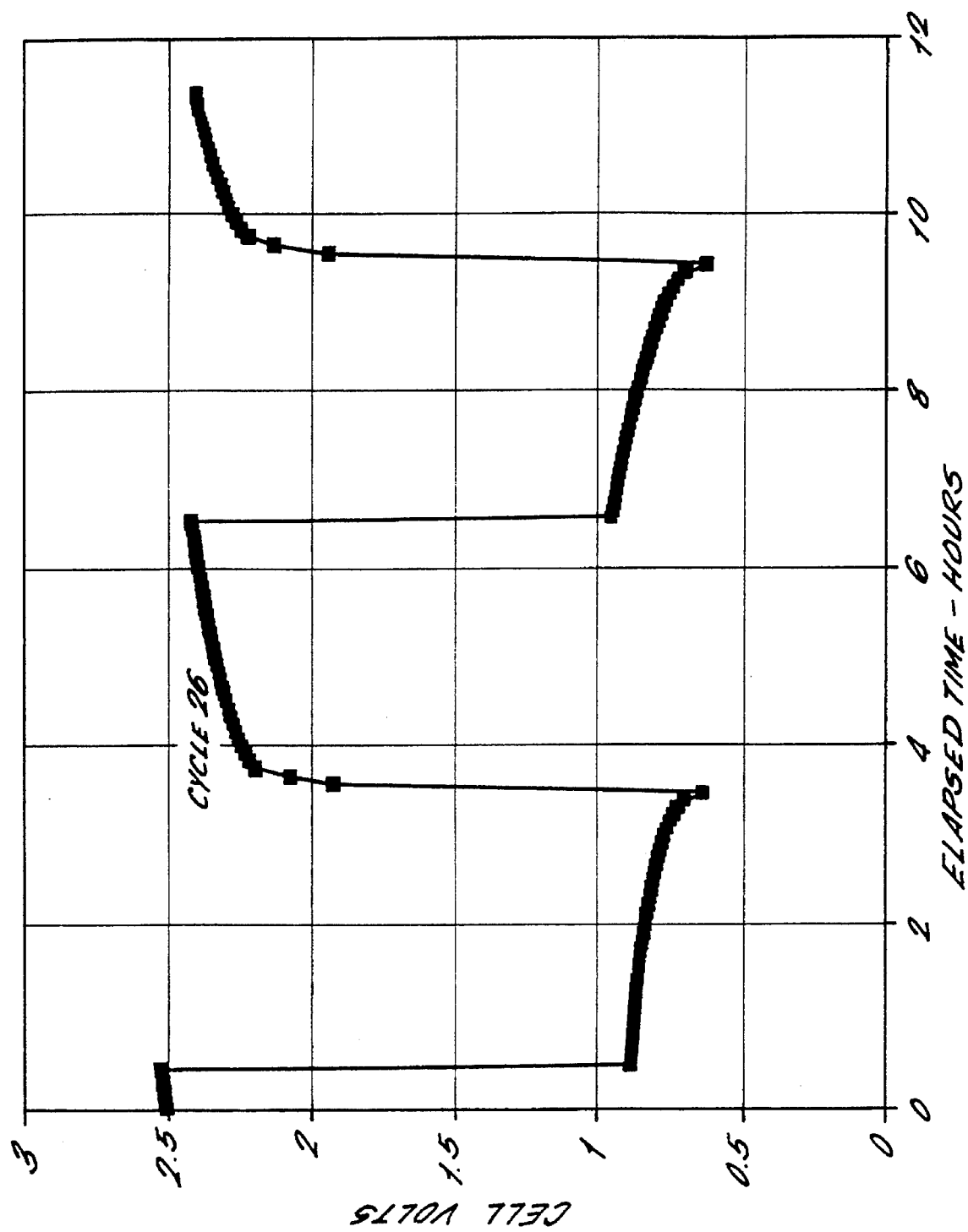

The cell resistance was initially 170 milliohms.
The cell was run for over 150 cycles. Periodically sulfur was added to the $-^{ve}$ chamber of the cell to compensate for sulfur losses from that chamber into the buffer chamber, since no steps were taken in this Example to recover the sulfur from the idler electrolyte in the sulfur chamber. The water levels in the $+^{ve}$ and $-^{vc}$ chambers were also periodically balanced. The typical performance of the cell on charge/discharge at 5 amps at cycle 26 is shown in FIG. 7 of the accompanying drawings.

EXAMPLE 7

A three compartment cell was constructed as in Example 5 with two layers of graphite cloth on the negative electrode. The cell component spacings were 0.25 cm from $-^{ve}$ electrode to membrane, 0.62 cm between membranes, and 0.25 cm from $+^{ve}$ electrode to membrane. The active area of the cell was 155 cm.

The electrolytes were:

| Positive side | 500 cc of 6 molar NaBr |
|---|---|
| Negative side | 300 cc of 0.75 Na$_2$S$_5$ |
| Buffer Chamber | 400 cc of 3 molar NaBr |

Figure 8:
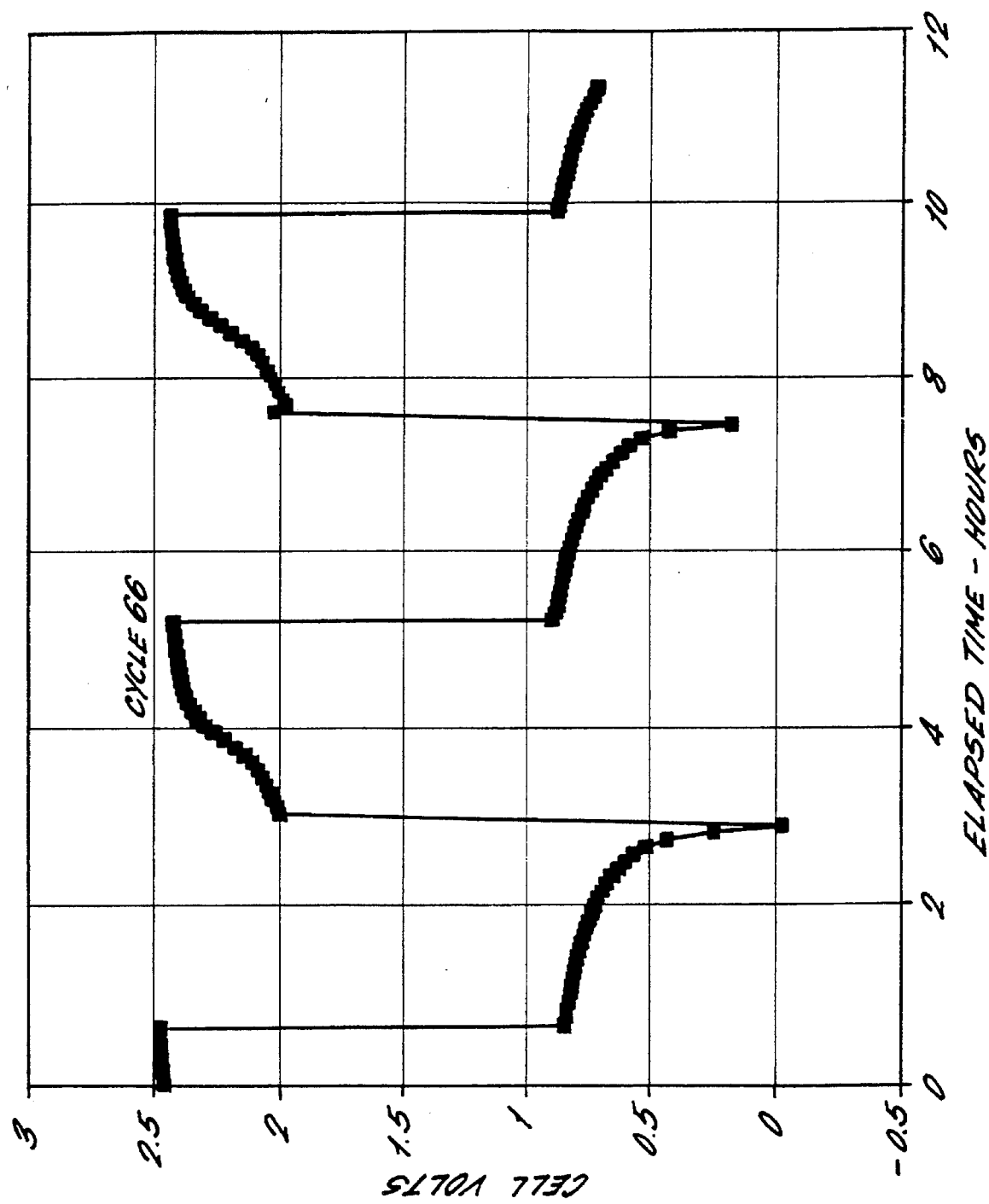

The electrolytes were recirculated through their respective compartments via flow distributors placed in the bottom of the respective compartments of the cell.
The cell resistance was initially 160 milliohms.
The cell was run for over 200 cycles. Periodically sulfur was added to the $-^{ve}$ chamber of the cell to compensate for sulfur losses from that chamber into the buffer chamber, since no steps were taken in this Example to recover the sulfur from the idler electrolyte in the sulfur chamber. The water levels in the $+^{ve}$ and $-^{vc}$ chambers were also periodically balanced. The performance of the cell on charge/discharge at 6 amps for cycles 66 and 67 is shown in FIG. 8 of the accompanying drawings.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. An electrochemical apparatus for energy storage and power delivery comprising, in combination:

(a) means for defining a single cell or an array of repeating cell structures, each cell with a chamber ($+^{ve}$ chamber) containing a $+^{ve}$ electrode and a chamber ($-^{ve}$ chamber) containing a $-^{ve}$ electrode, (b) means comprising a plurality of cation exchange membranes for separating the $+^{ve}$ chamber and the $-^{ve}$ chamber of each cell by at least one intermediate chamber, (c) means for circulating a $+^{ve}$ electrolyte through the $+^{ve}$ chamber, (d) means for circulating a $-^{ve}$ electrolyte through the $-^{ve}$ chamber, (e) means for circulating an idler electrolyte through the said intermediate chamber for collecting unwanted ionic species which cross the cation exchange membranes from the $+^{ve}$ or $-^{ve}$ chamber, (f) means for connecting said $+^{ve}$ electrodes to energy source (charging) means and to delivery (discharge) load means, and (g) means for recharging the system by driving a DC current into the $+^{ve}$ electrode and out of the $-^{ve}$ electrode.

2. An apparatus as defined in claim 1 which includes a plurality of intermediate chambers therein.

3. Apparatus as defined in claim 1 wherein the membranes separating the $+^{ve}$ chamber and the $-^{ve}$ chamber from the intermediate chamber are the same.

4. Apparatus as defined in claim 1 wherein the membranes separating the $+^{ve}$ chamber and the $-^{ve}$ chamber from the intermediate chamber are different.

5. Apparatus as defined in claim 1 wherein the $+^{ve}$ electrode is constructed for the attraction and storage of $Fe^{3+}$ ions formed at the electrode during charging of the cell when the electrolyte circulating through the $+^{ve}$ chamber contains iron.

6. An apparatus as defined in claim 1 wherein the $-^{ve}$ electrode is constructed for the attraction and storage of $S^{2-}$ ions during charging and enhances the formation of molecular sulfur during discharging when the electrolyte circulating through the $-^{ve}$ chamber contains sulfur.

7. An apparatus as defined in claim 5 or claim 6 wherein the electrodes are surfaced with activated carbon particles.

8. Apparatus as defined in claim 1 wherein the $+^{ve}$ electrode has a coating of non-conductive porous particles selected to increase the available surface area, to increase the surface wettability and to decrease the hydrolysis of bromine when the electrolyte circulating through the $+^{ve}$ chamber contains bromine.

9. Apparatus as defined in claim 8 wherein the coating comprises a mixture selected from the group consisting of silicon dioxide, a zeolite and like silicates admixed with activated carbon.

10. An apparatus as defined in claim 1 wherein means are provided for passing the idler electrolyte through a reclamation cell in order to retain any solids precipitated therein.

11. An apparatus as defined in claim 1 which comprises an array of repeating cell structures with end $+^{ve}$ and $-^{ve}$ electrodes and one or more intermediate bi-polar electrodes.

12. An electrochemical apparatus for energy storage and/or power delivery comprising, in combination:
   (a) means for defining a single cell or an array of repeating cell structures, each cell with a chamber ($+^{ve}$ chamber) containing a $+^{ve}$ electrode and a chamber ($-^{ve}$ chamber) containing a $-^{ve}$ electrode,
   (b) means comprising a plurality of cation exchange membranes for separating the $+^{ve}$ chamber and the $-^{ve}$ chamber of each cell by at least one intermediate chamber for collecting therein unwanted ionic species which cross the cation exchange membranes from the $+^{ve}$ or $-^{ve}$ chamber,
   (c) means for circulating an electrolyte containing iron through the $+^{ve}$ chamber,
   (d) means for circulating an electrolyte containing a sulfide and a soluble, ionic salt, selected from salts of the group consisting of sodium, potassium, lithium and ammonium salts, which acts as a charge carrier during power delivery, through the $-^{ve}$ chamber,
   (e) means for connecting said $+^{ve}$ electrodes to energy source (charging) means and for delivery (discharge) load means, and
   (f) means for recharging the system by driving a DC current into the $+^{ve}$ electrode and out of the $-^{ve}$ electrode.

13. An apparatus as defined in claim 12 which includes means for circulating an idler electrolyte through the said intermediate chamber.

14. An apparatus as defined in claim 12 which includes a plurality of intermediate chambers therein.

15. An apparatus as defined in claim 12 wherein the $+^{ve}$ electrode is constructed for the attraction and storage of $Fe^{3+}$ ions formed at the electrode during charging of the cell.

16. An apparatus as defined in claim 12 wherein the $-^{ve}$ electrode is constructed for the attraction and storage of $S^{2-}$ ions during charging and enhances the formation of molecular sulfur during discharging.

17. An apparatus as defined in claim 14 or claim 15 wherein the electrodes are surfaced with activated carbon particles.

18. An apparatus as defined in claim 12 which comprises an array of repeating cell structures with end $+^{ve}$ and $-^{ve}$ electrodes and one or more intermediate bi-polar electrodes.

19. An electrochemical apparatus for energy storage and power delivery comprising, in combination:
   (a) means for defining a single cell or an array of repeating cell structures, each cell with a chamber ($+^{ve}$ chamber) containing a $+^{ve}$ electrode and a chamber ($-^{ve}$ chamber) containing a $-^{ve}$ electrode,
   (b) means comprising a plurality of cation exchange membranes for separating the $+^{ve}$ chamber and the $-^{ve}$ chamber of each cell by at least one intermediate chamber,
   (c) means for circulating a $+^{ve}$ electrolyte containing bromine through the $+^{ve}$ chamber,
   (d) means for circulating a $-^{ve}$ electrolyte containing sulfide through the $-^{ve}$ chamber,
   (e) means for circulating an idler electrolyte through the said intermediate chamber for collecting unwanted ionic species which cross the cation exchange membranes from the $+^{ve}$ or $-^{ve}$ chamber,
   (f) means for connecting said $+^{ve}$ electrodes to energy source (charging) means and to delivery (discharge) load means, and
   (g) means for recharging the system by driving a DC current into the $+^{ve}$ electrode and out of the $-^{ve}$ electrode.

20. Apparatus as claimed in claim 19 wherein the $+^{ve}$ electrode has a coating of non-conductive porous particles to increase the available surface area, to increase the surface wettability and to decrease the hydrolysis of bromine.

21. Apparatus as claimed in claim 20 wherein the coating comprises a mixture selected from the group consisting of silicon dioxide, a zeolite and like silicates admixed with activated carbon.

22. Apparatus as claimed in claim 19 wherein the idler electrolyte is selected from the group consisting of $Na_2S_x$ and a mixture of $Na_2S_x$ and NaBr.

23. An electrochemical apparatus for energy storage and power delivery comprising, in combination:
   at least one cell, the cell comprising a $+^{ve}$ chamber containing a $+^{ve}$ electrode, a $-^{ve}$ chamber containing a $-^{ve}$ electrode, at lease one intermediate chamber provided between the $+^{ve}$ chamber and the $-^{ve}$ chamber, a plurality of cation exchange membranes separating the $+^{ve}$ chamber from the at least one intermediate chamber and separating the at least one intermediate chamber from the $-^{ve}$ chamber, a $+^{ve}$ electrolyte a $-^{ve}$ electrolyte and an idler electrolyte;
   means for circulating the $+^{ve}$ electrolyte through the $+^{ve}$ chamber;
   means for circulating the $-^{ve}$ electrolyte through the $-^{ve}$ chamber;
   means for circulating the idler electrolyte through the at least one intermediate chamber for collecting unwanted ionic species which cross the cation exchange membranes from the $+^{ve}$ or $-^{ve}$ chamber;
   a power source for recharging the apparatus by driving a DC current therethrough; and
   external terminals for connecting the $+^{ve}$ electrode and the $-^{ve}$ electrode to the power source or to a load.

24. Apparatus as claimed in claim 23, wherein the $+^{ve}$ electrolyte contains bromine and the $-^{ve}$ electrolyte contains sulfide.

25. Apparatus as claimed in claim 24, wherein the idler electrolyte contains a sulfide.

26. Apparatus as claims in claim 25, wherein the idler electrolyte comprises at least one material selected from the group consisting of $Na_2S_x$ and a mixture of $Na_2S_x$ and NaBr.

27. Apparatus as claimed in claim 23, wherein the $+^{ve}$ electrolyte contains iron and the $-^{ve}$ electrolyte contains sulfide and a soluble, ionic salt.

28. Apparatus as claimed in claim 27, wherein the soluble, ionic salt is selected from salts of the group consisting of sodium, potassium, lithium and ammonium salts.

29. Apparatus as claimed in claim 27, wherein the $+^{ve}$ electrolyte contains a salt of iron and the idler electrolyte contains a salt, the anion of which is the anion of the salt of iron in the $+^{ve}$ electrolyte.

30. Apparatus as claimed in claim 23, wherein a plurality of said cells are provided in an array of repeating cell structures.

* * * * *